(12) United States Patent
Gormley

(10) Patent No.: US 11,994,087 B2
(45) Date of Patent: May 28, 2024

(54) VARIABLE AREA NOZZLE AND METHOD FOR OPERATING SAME

(71) Applicant: Rohr, Inc., Chula Vista, CA (US)

(72) Inventor: Timothy Gormley, Bonita, CA (US)

(73) Assignee: ROHR, INC., Chula Vista, CA (US)

( * ) Notice: Subject to any disclaimer, the term of this patent is extended or adjusted under 35 U.S.C. 154(b) by 143 days.

(21) Appl. No.: 17/542,926

(22) Filed: Dec. 6, 2021

(65) Prior Publication Data
US 2023/0175457 A1   Jun. 8, 2023

(51) Int. Cl.
*F02K 1/12* (2006.01)

(52) U.S. Cl.
CPC ........ *F02K 1/1207* (2013.01); *F05D 2220/32* (2013.01)

(58) Field of Classification Search
CPC . F02K 1/1207; F02K 1/06; F02K 1/08; F02K 1/10; F02K 1/12; F02K 1/30; F02K 1/40; F02K 1/44; F02K 1/54; F02K 1/58; F02K 9/84; F02K 9/86; F05D 2220/32; F05D 2240/128
USPC ............................................................ 415/1
See application file for complete search history.

(56) References Cited

U.S. PATENT DOCUMENTS

| | | | | | |
|---|---|---|---|---|---|
| 2,735,264 A | * | 2/1956 | Jewett | ...... | F02K 1/60 239/265.29 |
| 2,968,150 A | * | 1/1961 | Goebel | ...... | F02K 1/48 239/265.37 |
| 2,972,860 A | | 2/1961 | Moy | | |
| 2,979,893 A | * | 4/1961 | Meyer | ...... | F02K 1/58 239/265.29 |
| 3,231,197 A | * | 1/1966 | Strom | ...... | F02K 1/10 239/265.17 |
| 3,550,855 A | * | 12/1970 | Buell | ...... | F02K 1/60 74/105 |
| 3,567,128 A | * | 3/1971 | Urquhart | ...... | F02K 1/60 239/265.29 |
| 3,610,534 A | * | 10/1971 | Medawar | ...... | F02K 1/60 239/265.29 |
| 3,622,075 A | * | 11/1971 | Harris | ...... | F02K 1/18 239/265.19 |
| 3,684,182 A | * | 8/1972 | Maison | ...... | F02K 1/52 239/265.19 |
| 3,690,562 A | * | 9/1972 | Smale | ...... | F02K 1/60 239/265.29 |
| 3,749,316 A | * | 7/1973 | Tontini | ...... | F02K 1/36 239/265.17 |

(Continued)

OTHER PUBLICATIONS

EP search report for EP22211824.2 dated May 8, 2023.

*Primary Examiner* — Hung Q Nguyen
*Assistant Examiner* — Anthony Donald Taylor, Jr.
(74) *Attorney, Agent, or Firm* — Getz Balich LLC

(57) ABSTRACT

A variable area nozzle assembly for a gas turbine engine includes a nozzle disposed about a nozzle centerline and a fixed ring radially surrounding the nozzle. The nozzle includes a radially outer surface and a radially inner surface. The radially inner surface defines an outlet cross-sectional area of the nozzle. The nozzle is movable relative to the nozzle centerline between a first position of the radially inner surface defining a maximum area of the outlet cross-sectional area and a second position of the radially inner surface defining a minimum area of the outlet cross-sectional area. With the nozzle in the first position, the radially outer surface contacts the fixed ring. With the nozzle in the second position, the radially outer surface is spaced from the fixed ring.

19 Claims, 6 Drawing Sheets

(56) References Cited

U.S. PATENT DOCUMENTS

| | | | | |
|---|---|---|---|---|
| 3,814,323 A * | 6/1974 | Leynaert | ............... | F02K 1/16 |
| | | | | 239/265.17 |
| 3,856,239 A * | 12/1974 | Leibach | ............... | F02K 1/60 |
| | | | | 244/110 B |
| 3,941,313 A * | 3/1976 | Jumelle | ............... | B64C 25/423 |
| | | | | 239/265.29 |
| 3,973,731 A * | 8/1976 | Thayer | ............... | F02K 1/12 |
| | | | | 239/265.29 |
| 4,026,105 A * | 5/1977 | James | ............... | F02K 1/64 |
| | | | | 239/265.29 |
| 4,147,027 A * | 4/1979 | Greathouse | ............... | F02K 1/60 |
| | | | | 60/230 |
| 4,805,840 A | 2/1989 | Tape | | |
| 4,850,535 A * | 7/1989 | Ivie | ............... | A63H 27/02 |
| | | | | 239/602 |
| 5,181,676 A * | 1/1993 | Lair | ............... | F02K 1/60 |
| | | | | 244/110 B |
| 5,470,020 A * | 11/1995 | Brossier | ............... | F02K 1/123 |
| | | | | 239/265.33 |
| 5,615,834 A * | 4/1997 | Osman | ............... | F02K 1/76 |
| | | | | 244/110 B |
| 5,794,433 A * | 8/1998 | Peters | ............... | F02K 1/60 |
| | | | | 239/265.29 |
| 6,256,979 B1 * | 7/2001 | Fournier | ............... | F02K 1/60 |
| | | | | 244/110 B |
| 9,650,992 B2 * | 5/2017 | Aten | ............... | F02K 1/70 |
| 10,018,152 B2 * | 7/2018 | Pascal | ............... | F02K 1/62 |
| 10,077,739 B2 * | 9/2018 | James | ............... | F02K 1/763 |
| 10,156,207 B2 * | 12/2018 | Osman | ............... | F02K 1/827 |
| 2010/0229528 A1 * | 9/2010 | Ramlaoui | ............... | F02K 3/06 |
| | | | | 74/89.23 |
| 2014/0030057 A1 * | 1/2014 | Gormley | ............... | F02K 1/42 |
| | | | | 415/126 |
| 2014/0234081 A1 * | 8/2014 | Amkraut | ............... | F02K 1/09 |
| | | | | 415/145 |
| 2016/0195038 A1 * | 7/2016 | Sidelkovskiy | ............... | F02C 3/04 |
| | | | | 60/770 |
| 2016/0201601 A1 * | 7/2016 | Nakhjavani | ............... | F02K 1/72 |
| | | | | 239/265.19 |
| 2018/0094605 A1 * | 4/2018 | Rosenau | ............... | F02K 1/763 |

* cited by examiner

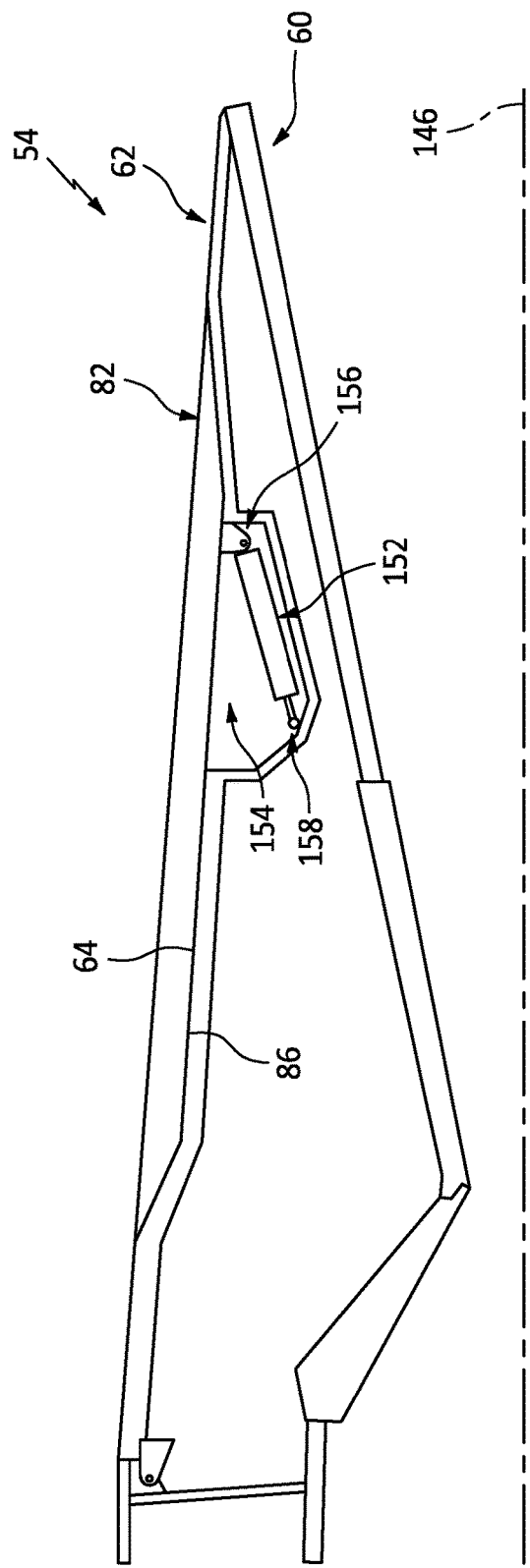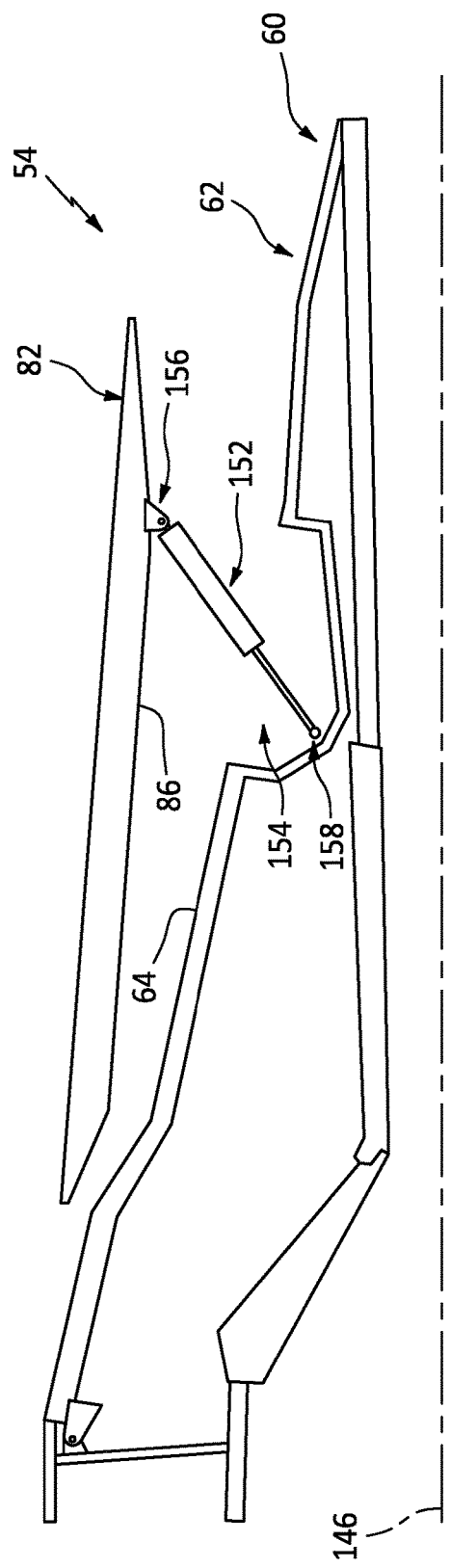

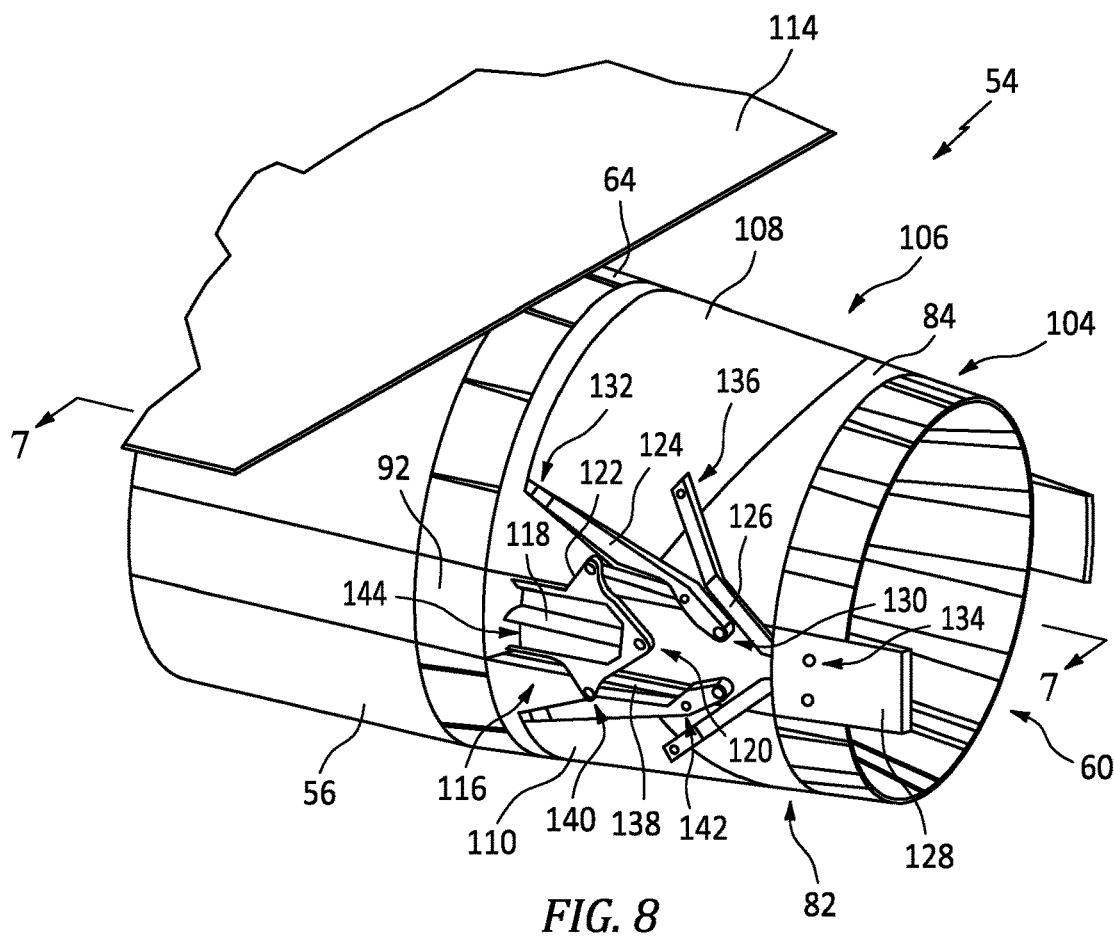
FIG. 8
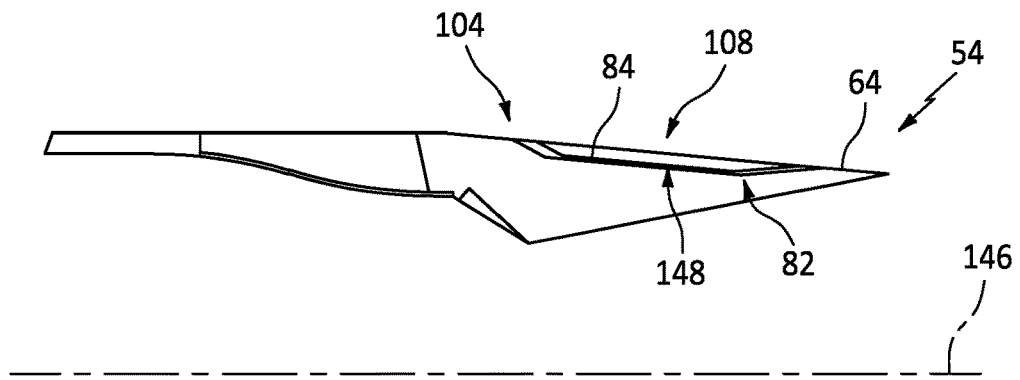
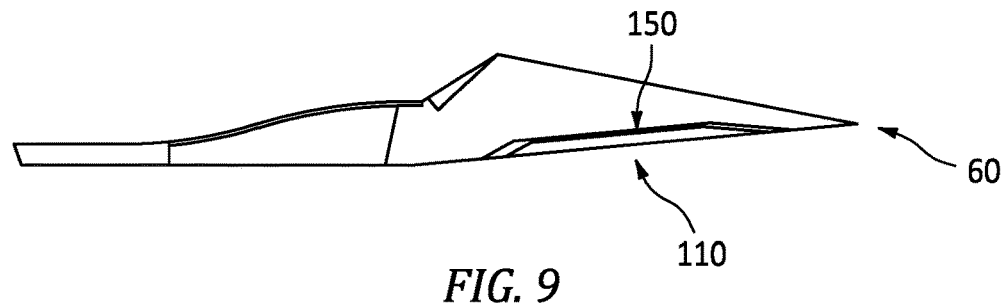
FIG. 9

VARIABLE AREA NOZZLE AND METHOD FOR OPERATING SAME

BACKGROUND

1. Technical Field

This disclosure relates generally to aircraft gas turbine engines, and more particularly to variable area nozzles assemblies for gas turbine engines.

2. Background Information

Turbojet engines for aircraft may frequently include variable area exhaust nozzles to accommodate subsonic, transonic, and supersonic speeds. Due to the different properties of exhaust gases as they flow through the nozzle at different speeds, there may be a need to vary the area of the nozzle at one or more locations within the nozzle in order to ensure proper and efficient turbojet operation over a range of aircraft flight conditions. What is needed are variable area nozzle assemblies which improve upon variable area nozzle assemblies conventionally known in the art.

SUMMARY

It should be understood that any or all of the features or embodiments described herein can be used or combined in any combination with each and every other feature or embodiment described herein unless expressly noted otherwise.

According to an aspect of the present disclosure, a variable area nozzle assembly for a gas turbine engine includes a nozzle disposed about a nozzle centerline and a fixed ring radially surrounding the nozzle. The nozzle includes a radially outer surface and a radially inner surface. The radially inner surface defines an outlet cross-sectional area of the nozzle. The nozzle is movable relative to the nozzle centerline between a first position of the radially inner surface defining a maximum area of the outlet cross-sectional area and a second position of the radially inner surface defining a minimum area of the outlet cross-sectional area. With the nozzle in the first position, the radially outer surface contacts the fixed ring. With the nozzle in the second position, the radially outer surface is spaced from the fixed ring.

In any of the aspects or embodiments described above and herein, the variable area nozzle assembly may further include a first thrust reverser door and a second thrust reverser door. Each of the first thrust reverser door and the second thrust reverser door may be moveable between a stowed position in which the first thrust reverser door and the second thrust reverser door are mounted against the fixed ring and a deployed position in which the first thrust reverser door and the second thrust reverser door are positioned axially aft of the nozzle.

In any of the aspects or embodiments described above and herein, the fixed ring may include a radially outer ring side and a radially inner ring side and the radially outer ring side may define a first recess and a second recess in which the first thrust reverser door and the second thrust reverser door, respectively, are positioned in the stowed position.

In any of the aspects or embodiments described above and herein, the radially outer surface of the nozzle may define a door recess in which the fixed ring is positioned with the nozzle in the first position.

In any of the aspects or embodiments described above and herein, with the nozzle in the first position and the first thrust reverser door and the second thrust reverser door in the respective stowed positions, the radially outer surface, the radially outer ring side, the first thrust reverser door, and the second thrust reverser door may define a substantially flush exterior surface.

In any of the aspects or embodiments described above and herein, the nozzle may include an axially forward end and an axially aft end and the fixed ring may be positioned entirely axially between the axially forward end and the axially aft end.

In any of the aspects or embodiments described above and herein, the variable area nozzle assembly may further include a plurality of actuators. Each actuator of the plurality of actuators may include a first actuator end pivotably mounted to the fixed ring and a second actuator end pivotably mounted to the nozzle.

According to another aspect of the present disclosure, a gas turbine engine includes a fixed structure and a nozzle hingedly mounted to the fixed structure and disposed about a nozzle centerline. The nozzle includes a radially outer surface and a radially inner surface. The radially inner surface defines an outlet cross-sectional area of the nozzle. The nozzle is movable relative to the nozzle centerline between a first position of the radially inner surface defining a maximum area of the outlet cross-sectional area and a second position of the radially inner surface defining a minimum area of the outlet cross-sectional area. A fixed ring radially surrounds the nozzle. With the nozzle in the first position, the radially outer surface contacts the fixed ring. With the nozzle in the second position, the radially outer surface is spaced from the fixed ring.

In any of the aspects or embodiments described above and herein, the fixed ring may be axially spaced from the fixed structure and the fixed ring may be founded to the fixed structure by at least one side beam.

In any of the aspects or embodiments described above and herein, the gas turbine engine may further include a first thrust reverser door and a second thrust reverser door. Each of the first thrust reverser door and the second thrust reverser door may be moveable between a stowed position in which the first thrust reverser door and the second thrust reverser door are mounted against the fixed ring and a deployed position in which the first thrust reverser door and the second thrust reverser door are positioned axially aft of the nozzle.

In any of the aspects or embodiments described above and herein, the fixed ring may include a radially outer ring side and a radially inner ring side and the radially outer ring side may define a first recess and a second recess in which the first thrust reverser door and the second thrust reverser door, respectively, are positioned in the stowed position.

In any of the aspects or embodiments described above and herein, the gas turbine engine may further include at least one actuation system mounted to the fixed ring circumferentially between the first recess and the second recess with respect to the nozzle centerline.

In any of the aspects or embodiments described above and herein, the at least one actuation system may include a linear actuator and a carrier mounted to the linear actuator. The linear actuator may be configured to translate the carrier in a substantially axial direction. The carrier may be connected to each of the first thrust reverser door and the second thrust reverser door by at least one linkage.

In any of the aspects or embodiments described above and herein, the gas turbine engine may further include a plurality of actuators. Each actuator of the plurality of actuators may include a first actuator end pivotably mounted to the fixed ring and a second actuator end pivotably mounted to the nozzle.

According to another aspect of the present disclosure, a method for operating a variable area nozzle assembly for a gas turbine engine is disclosed. The method includes moving a nozzle relative to a nozzle centerline of the nozzle from a first position toward a second position. The nozzle includes a radially outer surface and a radially inner surface. The radially inner surface defines an outlet cross-sectional area of the nozzle. With the nozzle in the first position, the radially inner surface defines a maximum area of the outlet cross-sectional area and the radially outer surface contacts a fixed ring radially surrounding the nozzle. With the nozzle in the second position, the radially inner surface defines a minimum area of the outlet cross-sectional area and the radially outer surface is spaced from the fixed ring.

In any of the aspects or embodiments described above and herein, the method may further include deploying a first thrust reverser door and a second thrust reverser door by moving each of the first thrust reverser door and the second thrust reverser door from a stowed position in which the first thrust reverser door and the second thrust reverser door are mounted against the fixed ring to a deployed position in which the first thrust reverser door and the second thrust reverser door are positioned axially aft of the nozzle.

In any of the aspects or embodiments described above and herein, the fixed ring may include a radially outer ring side and a radially inner ring side and the radially outer ring side may define a first recess and a second recess in which the first thrust reverser door and the second thrust reverser door, respectively, are positioned in the stowed position.

In any of the aspects or embodiments described above and herein, the radially outer surface of the nozzle may define a door recess in which the fixed ring is positioned with the nozzle in the first position.

In any of the aspects or embodiments described above and herein, with the nozzle in the first position and the first thrust reverser door and the second thrust reverser door in the respective stowed positions, the radially outer surface, the radially outer ring side, the first thrust reverser door, and the second thrust reverser door may define a substantially flush exterior surface.

In any of the aspects or embodiments described above and herein, the step of moving the nozzle relative to the nozzle centerline of the nozzle from the first position toward the second position may include moving the nozzle with a plurality of actuators. Each actuator of the plurality of actuators may include a first actuator end pivotably mounted to the fixed ring and a second actuator end pivotably mounted to the nozzle.

The present disclosure, and all its aspects, embodiments and advantages associated therewith will become more readily apparent in view of the detailed description provided below, including the accompanying drawings.

BRIEF DESCRIPTION OF THE DRAWINGS

FIG. 6 illustrates a cross-sectional view of a variable area nozzle assembly having a nozzle in a maximum A9 position, in accordance with one or more embodiments of the present disclosure.

FIG. 7 illustrates a cross-sectional view of the variable area nozzle assembly of FIG. 6 having the nozzle in a minimum A9 position, in accordance with one or more embodiments of the present disclosure.

FIG. 8 illustrates a perspective view of a variable area nozzle assembly including thrust reverser doors in a stowed position, in accordance with one or more embodiments of the present disclosure.

FIG. 9 illustrates a cross-sectional view of the variable area nozzle assembly of FIG. 8 taken along line 9-9, in accordance with one or more embodiments of the present disclosure.

DETAILED DESCRIPTION

Figure 1:
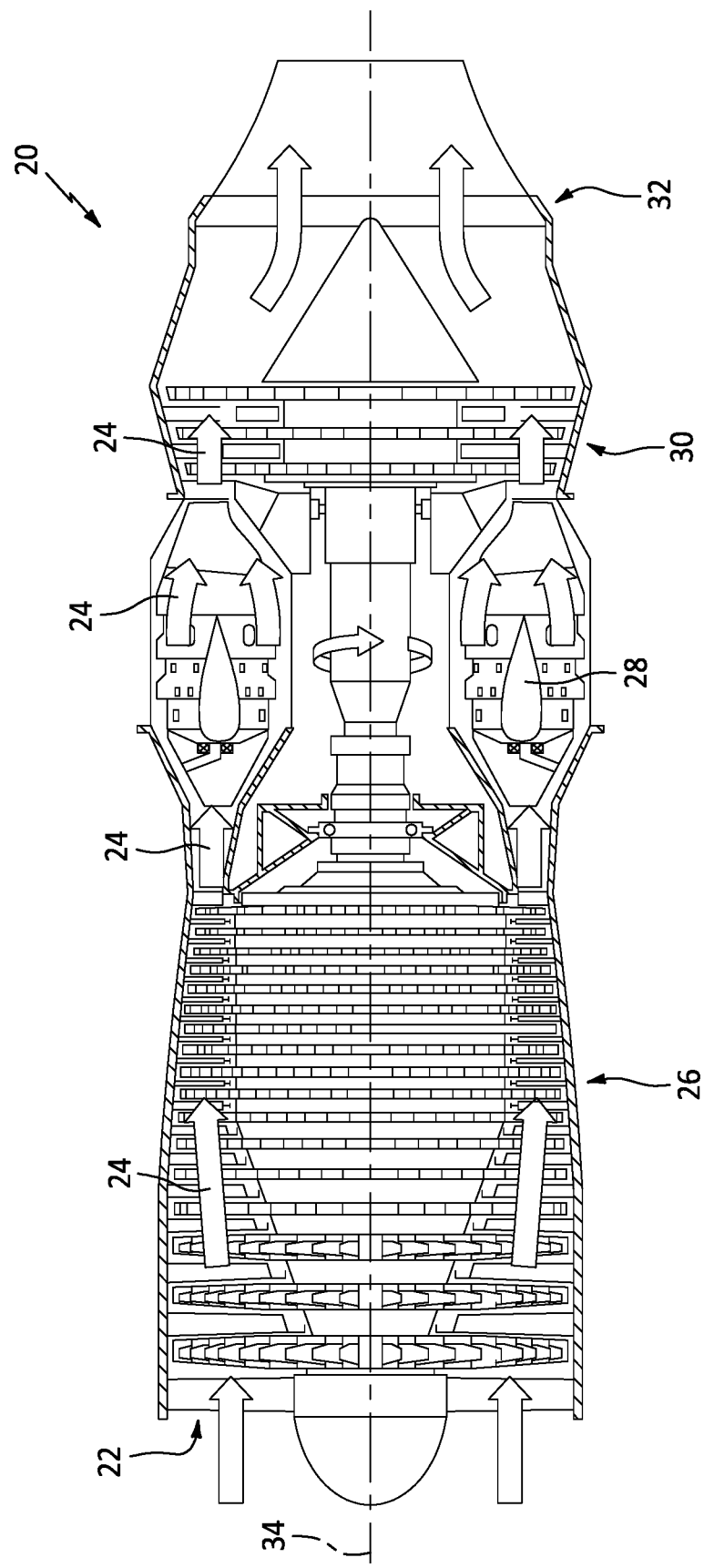
FIG. 1 illustrates a side cutaway view of a gas turbine engine, in accordance with one or more embodiments of the present disclosure.

Referring to FIG. 1, an exemplary gas turbine engine 20 capable of using aspects of the present disclosure is schematically illustrated. Although depicted as a turbojet gas turbine engine in the disclosed non-limiting embodiments, it should be understood that the concepts described herein are not limited to use with turbojets and may be applicable to other configurations of aircraft gas turbine engines as well including, but not limited to turboprop and turbofan gas turbine engines.

The gas turbine engine 20 generally includes a fan 22 through which ambient air is propelled along a core flow path 24, a compressor 26 for pressurizing the air received from the fan 22 and a combustor 28 wherein the compressed air is mixed with fuel and ignited for generating combustion gases. The gas turbine engine 20 further includes a turbine section 30 for extracting energy from the combustion gases. The resultant combustion gases from the combustor 28 are expanded over the turbine section 30 and then exhausted via an exhaust section 32, thereby providing thrust. The fan 22, compressor 26, combustor 28, and turbine 30 are typically all concentric about a common axial centerline 34 of the gas turbine engine 20.

The gas turbine engine 20 may further comprise a low-pressure compressor located upstream of a high-pressure compressor and a high-pressure turbine located upstream of a low-pressure turbine. For example, the compressor 26 may be a multi-stage compressor 26 that has a low-pressure compressor and a high-pressure compressor and the turbine 30 may be a multistage turbine 30 that has a high-pressure turbine and a low-pressure turbine. In one embodiment, the low-pressure compressor may be connected to the low-pressure turbine by a low-pressure shaft and the high-pressure compressor may be connected to the high-pressure turbine by a high-pressure shaft. In some embodiments, a gear arrangement (not shown) may connect the fan 22 and the compressor 26 such that the fan 22 and compressor 26 are enabled to have different rotational speeds. In other embodiments, the gas turbine engine 20 may be a direct drive engine.

Referring to FIGS. 2-5, aspects of the present disclosure include a variable area nozzle assembly 54 for the exhaust section 32. The variable area nozzle assembly 54 includes a fixed structure 56 of the gas turbine engine 20 which may be defined, for example, by a core cowling, an engine nacelle, or other suitable fixed structure of the gas turbine engine 20. The fixed structure 56 radially surrounds an exhaust duct 58 generally disposed about a nozzle centerline 146 which may or may not be colinear with the axial centerline 34 of the gas turbine engine 20. The variable area nozzle assembly 54 is configured to direct core gases along the core flow path 24 from the turbine section 30 and/or bypass gases to a variable area nozzle 60 located at a downstream end of the exhaust section 32. As shown, for example, in FIG. 3, the nozzle 60 may be configured as a convergent-divergent nozzle. However, the present disclosure is not limited to this particular nozzle configuration and aspects of the present disclosure may be applicable to other configurations of variable area nozzles as well.

The nozzle 60 includes a plurality of outer petals 62 (e.g., "flaps") pivotally mounted to the fixed structure 56. Each of the plurality of outer petals 62 includes a forward end 94 pivotally mounted to the fixed structure 56 and an aft end 96 opposite the forward end 94. The plurality of outer petals 62 are circumferentially disposed about the nozzle centerline 146 to define a radially outer surface 64 of the nozzle 60. The nozzle 60 further includes a plurality of inner petals 66 radially inward of the outer petals 62 with respect to the nozzle centerline 146. The plurality of inner petals 66 are circumferentially disposed about the nozzle centerline 146 to define a radially inner surface 68 of the nozzle 60. The plurality of inner petals 66 includes a first portion of inner petals 70 pivotally mounted to the exhaust duct 58 or the fixed structure 56. The first portion of inner petals 70 define an upstream "A8" axial portion of the nozzle 60 which may be a converging portion of the nozzle 60. The plurality of inner petals 66 further includes a second portion of inner petals 72 pivotally mounted to respective petals of the first portion of inner petals 70 at respective pivot joints 74. The first portion of inner petals 70 and the second portion of inner petals 72 define a variable "throat" cross-sectional area 76 of the nozzle 60 at the axial location of the pivot joints 74. The second portion of inner petals 72 define a downstream "A9" axial portion of the nozzle 60 which may be a diverging portion of the nozzle 60. The second portion of inner petals 72 defines a variable "outlet" cross-sectional area 78 of the nozzle 60 at the downstream axial end 80 of the second portion of inner petals 72. The outer petals 62 may be pivotally mounted to the second portion of inner petals 72 at or proximate the downstream axial end 80.

In some embodiments, the second portion of inner petals 72 may be further divided into a forward portion of inner petals 72A and an aft portion of inner petals 72B. The forward portion inner petals 72A and the aft portion of inner petals 72B may engage one another at a slip joint 160 where the forward portion of inner petals 72A and the aft portion of inner petals 72B overlap one another. The configuration of the slip joint 160 allows a length of the second portion of inner petals 72 to change as the A9 position of the nozzle 60 is varied between the maximum A9 position (see FIG. 3) and the minimum A9 position (see FIG. 5).

Figure 3:
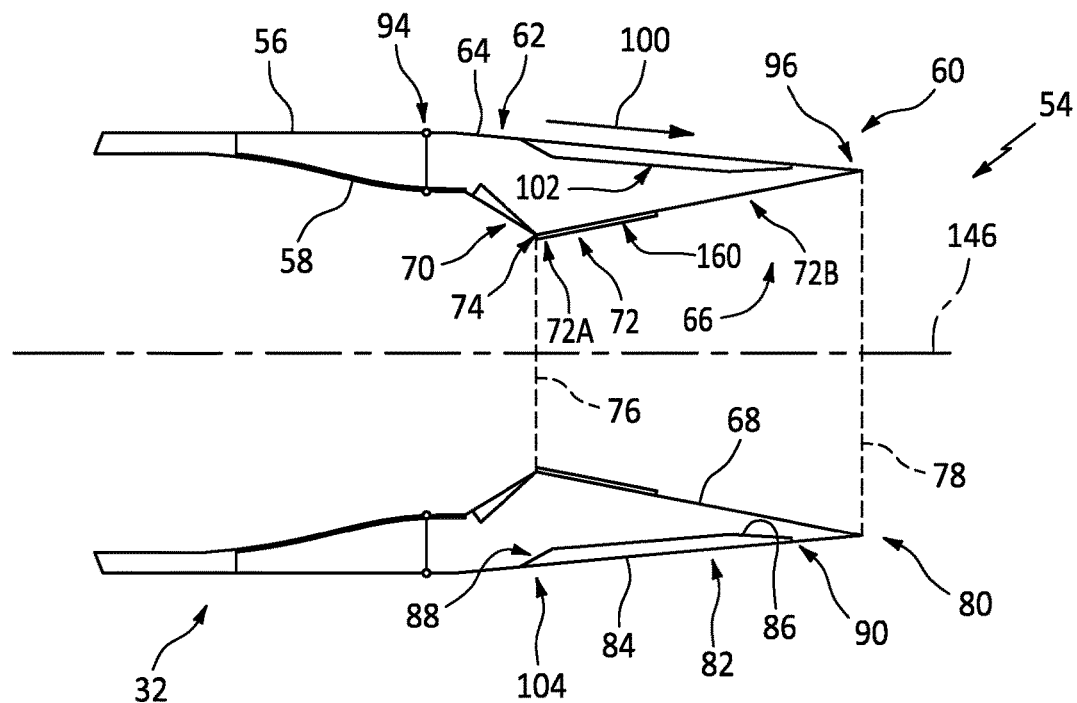
FIG. 3 illustrates a cross-sectional view of the variable area nozzle assembly of FIG. 2 taken along Line 3-3, in accordance with one or more embodiments of the present disclosure.
Figure 5:
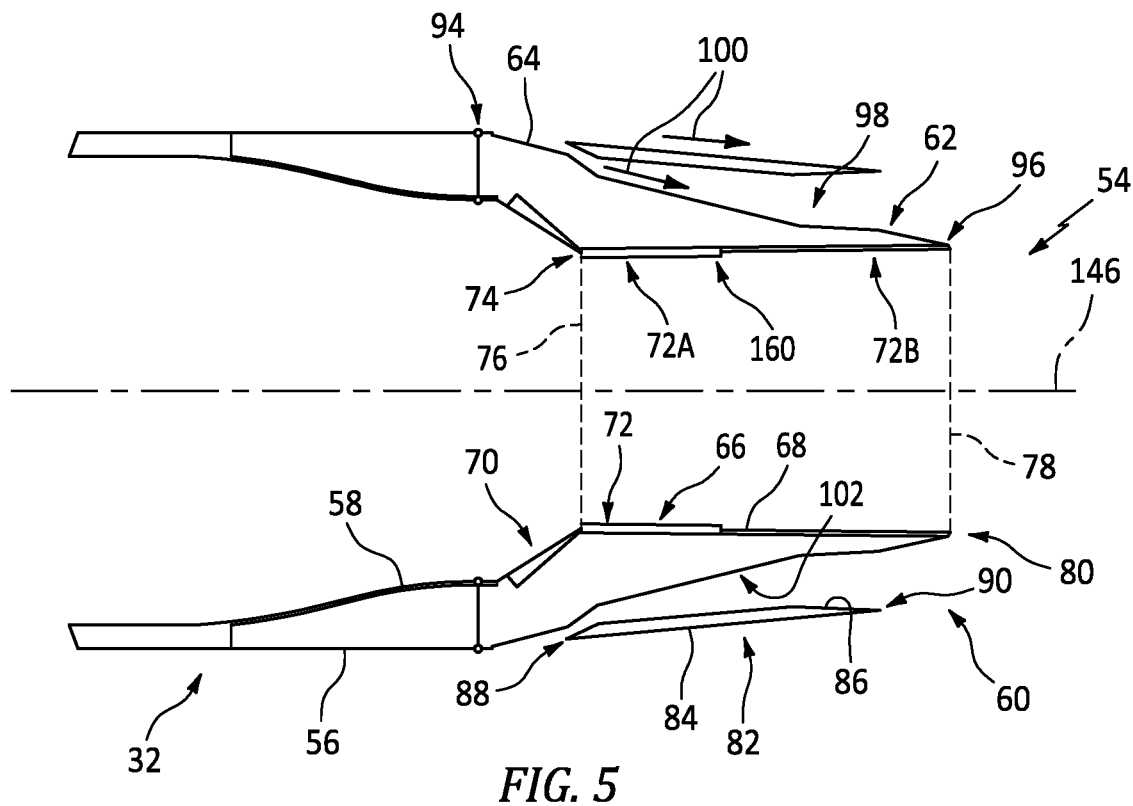
FIG. 5 illustrates a cross-sectional view of the variable area nozzle assembly of FIG. 4 taken along Line 5-5, in accordance with one or more embodiments of the present disclosure.

The nozzle 60 is moveable relative to the nozzle centerline 146. The petals 62, 66 of the nozzle 60 may be actuated to selectively vary the areas of the throat cross-sectional area 76 and/or the outlet cross-sectional area 78. As shown in FIG. 3, for example, the nozzle 60 is in a radially outermost position such that the radially inner surface 68 defines a maximum area of the outlet cross-sectional area 78 (e.g., a "maximum A9 position"). As shown in FIG. 5, for example, the nozzle 60 is in a radially innermost position such that the radially inner surface 68 defines a minimum area of the outlet cross-sectional area 78 (e.g., a "minimum A9 position"). As will be appreciated by those of ordinary skill in the art, variable area nozzle assemblies, such as the variable area nozzle assembly 54, may include actuation systems configured for moving petals of a variable area nozzle which are well known in the art. Accordingly, for the sake of clarity, said actuation systems have been omitted from the figures and description herein. The present disclosure is not limited to any particular actuation system for actuation of the petals 62, 66 to selectively vary the areas of the throat cross-sectional area 76 and/or the outlet cross-sectional area 78.

The variable area nozzle assembly 54 includes a fixed ring 82 radially surrounding the nozzle 60. The fixed ring 82 includes a radially outer ring side 84 and a radially inner ring side 86 opposite the radially outer ring side 84. Each of the radially outer ring side 84 and the radially inner ring side 86 extend between a forward ring end 88 and an aft ring end 90. The fixed ring 82 is axially spaced from the fixed structure 56 and may be mounted to the fixed structure 56 by one or more side beams 92. In some embodiments, the fixed ring 82 may be axially positioned within the axial span of the plurality of outer petals 62. For example, the forward ring end 88 may be axially spaced aft of the forward end 94 of the plurality of outer petals 62 and the aft ring end 90 may be axially spaced forward of the aft end 96 of the plurality of outer petals 62.

Figure 2:
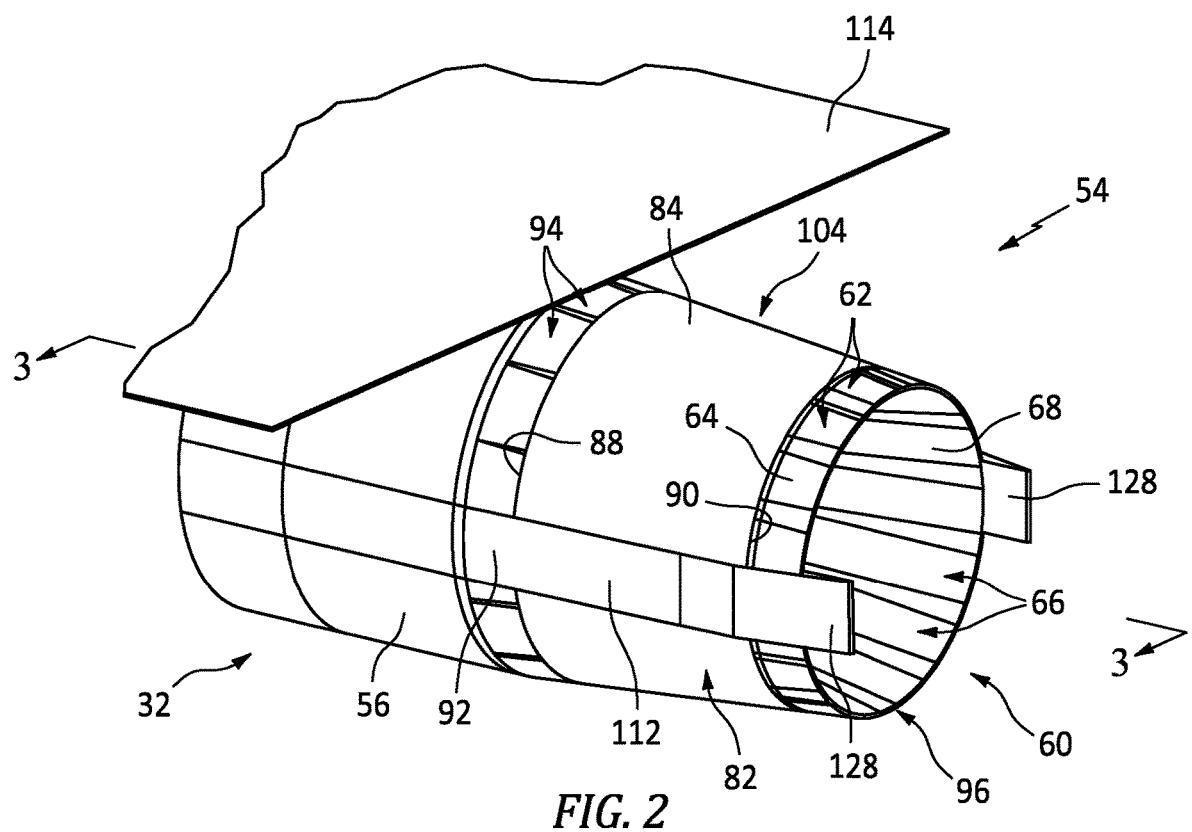
FIG. 2 illustrates a perspective view of a variable area nozzle assembly having a nozzle in a maximum A9 position, in accordance with one or more embodiments of the present disclosure.

As shown in FIGS. 2 and 3, the fixed ring 82 may be positioned relative to the nozzle 60 such that, with the nozzle 60 in the maximum A9 position, the radially outer surface 64 of the nozzle 60 may contact the radially inner ring side 86 of the fixed ring 82. Accordingly, the fixed ring 82 may be configured to provide structural support for the nozzle 60 with the nozzle in the maximum A9 position. The maximum A9 position may typically be a position of the nozzle 60 during cruising operations and/or when operating at supersonic speeds. Moreover, loads on the nozzle 60 may typically be greatest during cruising and/or supersonic operations due to the large pressure differential developed between the inside of the nozzle 60 and the ambient air outside the nozzle 60. Thus, contact between the fixed ring 82 and the nozzle 60 may improve the structural stability of the variable area nozzle assembly 54 at the maximum A9 position by allowing hoop loading of the petals 62, 66 onto the fixed ring 82, thereby providing an efficient load path for the petals 62, 66. In some embodiments, the variable area nozzle assembly 54 may include one or more resilient bumpers (not shown) mounted between the fixed ring 82 and the nozzle 60 and configured to contact both of the fixed ring 82 and the nozzle 60 with the nozzle in the maximum A9 position.

As will be discussed in further detail, the fixed ring 82 may additionally provide structural support for additional components of one or more embodiments of the variable area nozzle assembly 54 according to the present disclosure. In some embodiments, the side beams 92 may be used to structurally support one or more additional components of the variable area nozzle assembly 54. The side beams 92 may extend in a generally axial direction along the radially outer ring side 84 of the fixed ring 82 and may include portions of the fixed ring 82. In some embodiments, the side beams 92 may extend axially aft of the aft ring end 90 of the fixed ring 82 as shown, for example, in FIGS. 2 and 5, to define an axial extension portion 128 of the side beams 92. In some embodiments, the side beams 92 may include a detachable fairing 112 used to cover one or more variable area nozzle assembly 54 components mounted to the fixed ring 82. The radially outer ring side 84 of the fixed ring 82 and the detachable fairing 112 may define a radial gap therebetween.

Figure 4:
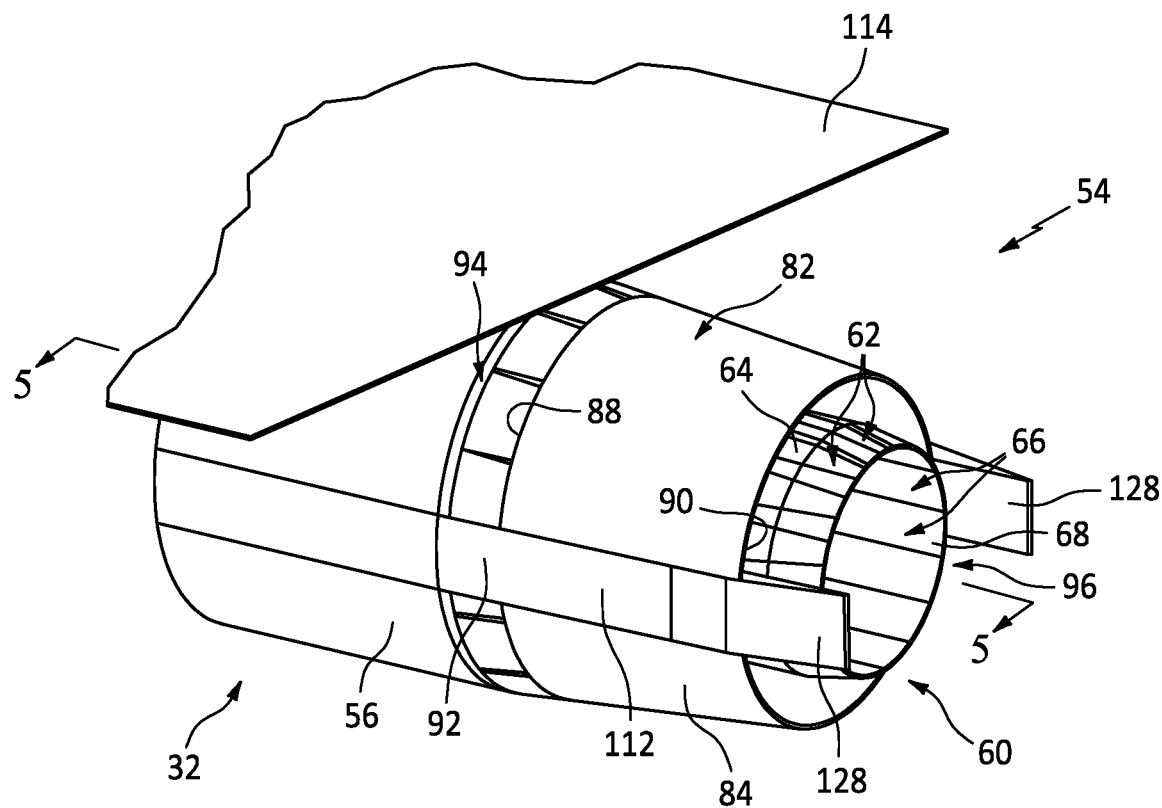
FIG. 4 illustrates a perspective view of a variable area nozzle assembly having a nozzle in a minimum A9 position, in accordance with one or more embodiments of the present disclosure.

Further, as shown in FIGS. 4 and 5, the fixed ring 82 may be positioned relative to the nozzle 60 such that, with the nozzle positioned radially inward of the maximum A9 position, the radially outer surface 64 of the nozzle 60 may be spaced (e.g., radially spaced) from the radially inner ring side 86 of the fixed ring 82 to define a gap 98. As shown in FIG. 5, air external to the nozzle 60 (illustrated in FIG. 5 as air flow 100) may flow along the radially outer ring side 84 of the fixed ring 82 as well as through the gap 98 defined between the fixed ring 82 and the nozzle 60. As the nozzle approaches the maximum A9 position and contacts the fixed ring 82, the air flow 100 through the gap 98 may be entirely or substantially eliminated.

Still referring to FIGS. 2-5, in some embodiments, the radially outer surface 64 of the nozzle 60 may define a door recess 102 in which the fixed ring 82 is positioned with the nozzle 60 in the maximum A9 position (see, e.g., FIG. 3). In some embodiments, with the nozzle 60 in the maximum A9 position, the radially outer surface 64 of the nozzle 60 and the radially outer ring side 84 of the fixed ring 82 may define a flush or substantially flush (e.g., within component design and operational tolerances) exterior surface 104 of the variable area nozzle assembly 54, thereby minimizing or eliminating any aerodynamic drag which might otherwise be caused by the fixed ring 82.

Referring to FIGS. 6 and 7, in some embodiments, the variable area nozzle assembly 54 may include a plurality of actuators 152 connecting the fixed ring 82 to the nozzle 60 and configured to selectively position the nozzle 60 between the maximum A9 position (see FIG. 6) and the minimum A9 position (see FIG. 7). The plurality of actuators 152 are circumferentially spaced from one another about the nozzle centerline 146. In some embodiments, each of the petals 62 of the plurality of outer petals 62 may be operably connected to the fixed ring 82 by a respective actuator 152 of the plurality of actuators 152. However, in some embodiments, fewer than each of the petals 62 of the plurality of outer petals 62 may be operably connected to the fixed ring 82 by a respective actuator 152 of the plurality of actuators 152 (e.g., every other outer petal, every third outer petal, etc.). The plurality of outer petals 62 may define a plurality of recesses 154 in the radially outer surface 64 of the nozzle 60 within which respective actuators 152 of the plurality of actuators 152 may be at least partially retained, as shown in FIGS. 6 and 7. Each actuator 152 of the plurality of actuators 152 may include a first end 156 pivotably mounted to the radially inner ring side 86 of the fixed ring 82. Each actuator 152 of the plurality of actuators 152 may further include a second end 158 pivotably mounted to a respective outer petal 62 of the plurality of outer petals 62, for example, within a respective recess 154 of the plurality of recesses 154. Accordingly, the plurality of actuators 152 may actuate (e.g., linearly expand or contract) to control a position of the nozzle 60 (e.g., the A9 position) relative to the nozzle centerline 146. The plurality of actuators 152 may include pneumatic actuators, hydraulic actuators, electrical-mechanical actuators, or the like, and the present disclosure is not limited to any particular configuration of actuator.

Figure 10:
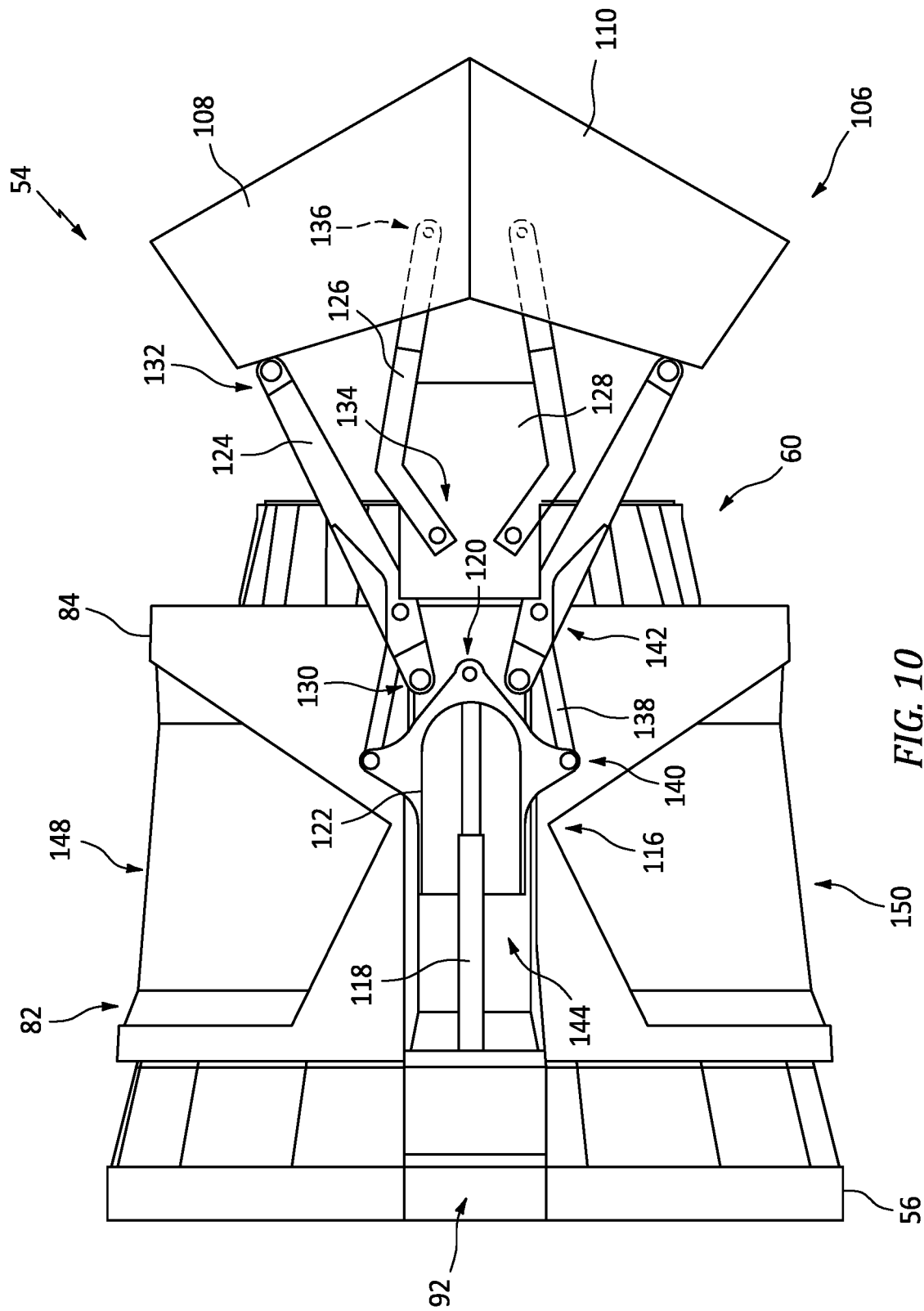
FIG. 10 illustrates a side view of the variable area nozzle assembly of FIG. 8 including the thrust reverser doors in a deployed position, in accordance with one or more embodiments of the present disclosure.

Referring to FIGS. 8-10, in some embodiments, the variable area nozzle assembly 54 may include a thrust reverser system 106 including a first thrust reverser door 108 and a second thrust reverser door 110. Each of the first thrust reverser door 108 and the second thrust reverser door 110 are movable between a stowed position (see, e.g., FIGS. 8 and 9) and a deployed position (see, e.g., FIG. 10). In the stowed position, the first thrust reverser door 108 and the second thrust reverser door 110 are mounted against the radially outer ring side 84 of the fixed ring 82. In the deployed position, the first thrust reverser door 108 and the second thrust reverser door 110 are positioned axially aft of the nozzle 60 to block and/or deflect exhaust gases exiting the nozzle 60. In some common flight conditions, the thrust reverser doors 108, 110 may be actuated to move from the stowed position to the deployed position with the nozzle 60 positioned at or near the minimum A9 position.

As shown in FIGS. 8 and 9, in the stowed position, the thrust reverser doors 108, 110 may be positioned so that the thrust reverser doors 108, 110 are entirely disposed within the axial span of the fixed ring 82. In some conventional thrust reverser systems, thrust reverser doors may be stowed in a position axially forward of the exhaust nozzle (e.g., adjacent the fixed structure axially forward of the nozzle) and may be repositioned axially aft of the exhaust nozzle when deployment of the thrust reverser system is necessary. This thrust reverser door configuration may be impractical, for example, in aircraft designs where it is desirable to position the exhaust nozzle of a gas turbine engine proximate an aircraft body structure (e.g., an aircraft body structure 114 such as a wing or fuselage of an aircraft), as the aircraft body structure might obstruct movement of the thrust reverser doors between the stowed and deployed positions. The thrust reverser system 106 of embodiments of the present disclosure is configured with a comparatively reduced axial span due to stowed position of the thrust reverser doors 108, 110 adjacent the fixed ring 82 surrounding the nozzle 60. Accordingly, greater flexibility in gas turbine engine orientation, and particularly variable area nozzle orientation, relative to aircraft body structures may be achieved.

In some embodiments, the radially outer ring side 84 of the fixed ring 82 may define a first recess 148 and a second recess 150 in which the first thrust reverser door 108 and the second thrust reverser door 110, respectively, are positioned in the stowed position. In some embodiments, with the nozzle 60 in the maximum A9 position and the thrust reverser doors 108, 110 in the respective stowed positions, the radially outer surface 64 of the nozzle 60, the radially outer ring side 84 of the fixed ring 82, the first thrust reverser door 108, and the second thrust reverser door 110, may define the flush or substantially flush (e.g., within component design and operational tolerances) exterior surface 104 of the variable area nozzle assembly 54, thereby minimizing or eliminating any aerodynamic drag which might otherwise be caused by the fixed ring 82 and the thrust reverser doors 108, 110.

The thrust reverser system 106 includes at least one actuation system 116 configured for moving the thrust reverser doors 108, 110 between the stowed and deployed positions. In FIGS. 8 and 10, illustration of the detachable fairing 112 has been omitted to clearly show the configuration of the at least one actuation system 116. The embodiments of the at least one actuation system 116 shown and described herein are configured as a four-bar actuation system, however, it should be understood that the present disclosure is not limited to any particular actuation system configuration for effecting movement of the thrust reverser doors 108, 110 and that other actuation system configurations may be contemplated within the scope of the present disclosure.

The at least one actuation system 116 may include a first actuation system and a second similar actuation system each positioned on opposing sides of the variable area nozzle assembly 54. However, for purposes of clarity, the at least one actuation system 116 will be described with respect to an actuation system disposed on one side of the variable area nozzle assembly 54. The at least one actuation system 116 includes an actuator 118 mounted to the fixed structure 56 and extending from the fixed structure 56 in a direction generally adjacent and/or through the fixed ring 82. The actuator 118 may be a pneumatic actuator, a hydraulic actuator, an electrical-mechanical actuator, or the like. A distal end 120 of the actuator 118 is mounted to a carrier 122 such that the actuator 118 is configured to effect linear translation of the carrier 122 adjacent the fixed ring 82.

Through linear translation of the carrier 122, the at least one actuation system 116 may be configured to effect movement of the thrust reverser doors 108, 110 between the respective stowed and deployed positions using a series of linkages. Each thrust reverser door 108, 110 may be pivotally mounted to the fixed ring 82 by a forward linkage 124. The forward linkage 124 may include a first end 130 rotatably mounted to the fixed ring 82 and a second end 132 rotatably mounted to a respective one of the thrust reverser doors 108, 110. Each thrust reverser door 108, 110 may be pivotally mounted to the axial extension portion 128 of the side beam 92 by an aft linkage 126. The aft linkage 126 may include a first end 134 rotatably mounted to the axial extension portion 128 and a second end 136 rotatably mounted to a respective one of the thrust reverser doors 108, 110. The carrier 122 may be pivotally mounted to each forward linkage 124 by a drive linkage 138. The drive linkage 138 may include a first end 140 rotatably mounted to the carrier 122 and a second end 142 rotatably mounted to a respective forward linkage 124 at a position between the first end 130 and the second end 132 of the respective forward linkage 124. Accordingly, linear translation of the carrier 122 by the actuator 118 in a first direction (e.g., a generally aftward direction) may cause the thrust reverser doors 108, 110 to move from the stowed position to the deployed position and linear translation of the carrier 122 by the actuator 118 in a second direction (e.g., a generally forward direction) may cause the thrust reverser doors 108, 110 to move from the deployed position to the stowed position.

In some embodiments, radially outer ring side 84 of the fixed ring 82 may further define at least one actuator recess 144. The at least one actuator recess 144 may be circumferentially aligned with a respective one of the side beams 92 such that the detachable fairing 112 (see, e.g., FIGS. 2 and 4) may be installed over the at least one actuator recess 144. The actuator 118 and carrier 122 for each actuation system of the at least one actuation system 116 may be disposed within and configured for linear translation within a respective actuator recess of the at least one actuator recess 144. In some embodiments, the carrier 122 may be retained within a slot (not shown) defined by the fixed ring 82 such that the fixed ring 82 allows axial translation of the carrier 122 but restricts radial and/or circumferential movement of the carrier 122.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A variable area nozzle assembly for a gas turbine engine, the variable area nozzle assembly comprising:
   a nozzle disposed about a nozzle centerline, the nozzle comprising a radially outer surface, a radially inner surface, an axially forward end, and an axially aft end, the radially outer surface extending from the axially forward end to the axially aft end, the radially inner surface defining an outlet cross-sectional area of the nozzle, the nozzle pivotable at the axially forward end relative to the nozzle centerline between a first position of the radially inner surface defining a maximum area of the outlet cross-sectional area and a second position of the radially inner surface defining a minimum area of the outlet cross-sectional area; and a fixed ring radially surrounding the nozzle such that with the nozzle in the first position the radially outer surface contacts the fixed ring, and with the nozzle in the second position the radially outer surface is radially spaced from the fixed ring, wherein the fixed ring is positioned axially between and axially spaced from the axially forward end and the axially aft end with the nozzle in the first position and the second position.

2. The variable area nozzle assembly of claim 1, further comprising a first thrust reverser door and a second thrust reverser door, each of the first thrust reverser door and the second thrust reverser door movable between a stowed position in which the first thrust reverser door and the second thrust reverser door are mounted against the fixed ring and a deployed position in which the first thrust reverser door and the second thrust reverser door are positioned axially aft of the nozzle.

3. The variable area nozzle assembly of claim 2, wherein the fixed ring comprises a radially outer ring side and a radially inner ring side and wherein the radially outer ring side defines a first recess and a second recess in which the first thrust reverser door and the second thrust reverser door, respectively, are positioned in the stowed position.

4. The variable area nozzle assembly of claim 3, wherein the radially outer surface of the nozzle defines a door recess in which the fixed ring is positioned with the nozzle in the first position.

5. The variable area nozzle assembly of claim 4, wherein with the nozzle in the first position and the first thrust reverser door and the second thrust reverser door in the respective stowed positions, the radially outer surface, the radially outer ring side, the first thrust reverser door, and the second thrust reverser door define a substantially flush exterior surface.

6. The variable area nozzle assembly of claim 1, further comprising a plurality of actuators, each actuator of the plurality of actuators including a first actuator end pivotably mounted to the fixed ring and a second actuator end pivotably mounted to the nozzle.

7. A gas turbine engine comprising:
a fixed structure;
a nozzle comprising an axially forward end, an axially aft end, a radially outer surface, and a radially inner surface, the nozzle hingedly mounted to the fixed structure at the axially forward end, the nozzle disposed about a nozzle centerline, the radially inner surface defining an outlet cross-sectional area of the nozzle, the nozzle movable relative to the nozzle centerline between a first position of the radially inner surface defining a maximum area of the outlet cross-sectional area and a second position of the radially inner surface defining a minimum area of the outlet cross-sectional area; and
a fixed ring radially surrounding the nozzle such that with the nozzle in the first position the radially outer surface contacts the fixed ring, and with the nozzle in the second position the radially outer surface is radially spaced from the fixed ring, wherein the fixed ring is positioned axially between and axially spaced from the axially forward end and the axially aft end with the nozzle in the first position and the second position.

8. The gas turbine engine of claim 7, wherein the fixed ring is axially spaced from the fixed structure and the fixed ring is mounted to the fixed structure by at least one side beam.

9. The gas turbine engine of claim 7, further comprising a first thrust reverser door and a second thrust reverser door, each of the first thrust reverser door and the second thrust reverser door movable between a stowed position in which the first thrust reverser door and the second thrust reverser door are mounted against the fixed ring and a deployed position in which the first thrust reverser door and the second thrust reverser door are positioned axially aft of the nozzle.

10. The gas turbine engine of claim 9, wherein the fixed ring comprising a radially outer ring side and a radially inner ring side and wherein the radially outer ring side defines a first recess and a second recess in which the first thrust reverser door and the second thrust reverser door, respectively, are positioned in the stowed position.

11. The gas turbine engine of claim 10, further comprising at least one actuation system mounted to the fixed ring circumferentially between the first recess and the second recess with respect to the nozzle centerline.

12. The gas turbine engine of claim 11, wherein the at least one actuation system comprises a linear actuator and a carrier mounted to the linear actuator, the linear actuator configured to translate the carrier in a substantially axial direction, the carrier connected to each of the first thrust reverser door and the second thrust reverser door by at least one linkage.

13. The gas turbine engine of claim 7, further comprising a plurality of actuators, each actuator of the plurality of actuators including a first actuator end pivotably mounted to the fixed ring and a second actuator end pivotably mounted to the nozzle.

14. A method of operating a variable area nozzle for a gas turbine engine, the method comprising:
pivoting an axially forward end of a nozzle relative to a nozzle centerline of the nozzle from a first position toward a second position, the nozzle comprising a radially outer surface and a radially inner surface, the radially inner surface defining an outlet cross-sectional area of the nozzle,
the radially inner surface with the nozzle in the first position defining a maximum area of the outlet cross-sectional area and the radially inner surface with the nozzle in the second position defining a minimum area of the outlet cross-sectional area, and
the radially outer surface with the nozzle in the first position contacting a fixed ring radially surrounding the nozzle, and the radially outer surface with the nozzle in the second position being radially spaced from the fixed ring, wherein the fixed ring is positioned axially between and axially spaced from the axially forward end and an axially aft of the nozzle with the nozzle in the first position and the second position.

15. The method of claim 14, further comprising deploying a first thrust reverser door and a second thrust reverser door by moving each of the first thrust reverser door and the second thrust reverser door from a stowed position in which the first thrust reverser door and the second thrust reverser door are mounted against the fixed ring to a deployed position in which the first thrust reverser door and the second thrust reverser door are positioned axially aft of the nozzle.

16. The method of claim 15, wherein the fixed ring comprises a radially outer ring side and a radially inner ring side and wherein the radially outer ring side defines a first recess and a second recess in which the first thrust reverser door and the second thrust reverser door, respectively, are positioned in the stowed position.

17. The method of claim 16, wherein the radially outer surface of the nozzle defines a door recess in which the fixed ring is positioned with the nozzle in the first position.

18. The method of claim 17, wherein with the nozzle in the first position and the first thrust reverser door and the second thrust reverser door in the respective stowed positions, the radially outer surface, the radially outer ring side, the first thrust reverser door, and the second thrust reverser door define a substantially flush exterior surface.

19. The method of claim 14, wherein pivoting the axially forward end of the nozzle relative to the nozzle centerline of the nozzle from the first position toward the second position includes moving the nozzle with a plurality of actuators, each actuator of the plurality of actuators including a first actuator end pivotably mounted to the fixed ring and a second actuator end pivotably mounted to the nozzle.

* * * * *